(12) United States Patent
Zhang et al.

(10) Patent No.: US 8,806,692 B2
(45) Date of Patent: Aug. 19, 2014

(54) QUICK CABLE DEICING DEVICE AND POWER COMPONENT THEREOF

(76) Inventors: Xinhua Zhang, Shenzhen (CN); Wei Zhang, Shenzhen (CN); Jian Xu, Shenzhen (CN)

( * ) Notice: Subject to any disclaimer, the term of this patent is extended or adjusted under 35 U.S.C. 154(b) by 279 days.

(21) Appl. No.: 13/497,579

(22) PCT Filed: Sep. 29, 2010

(86) PCT No.: PCT/CN2010/077492
§ 371 (c)(1),
(2), (4) Date: Mar. 22, 2012

(87) PCT Pub. No.: WO2011/038688
PCT Pub. Date: Apr. 7, 2011

(65) Prior Publication Data
US 2012/0174327 A1    Jul. 12, 2012

(30) Foreign Application Priority Data

Sep. 30, 2009 (CN) .......................... 2009 1 0190574

(51) Int. Cl.
*H02G 7/16* (2006.01)
(52) U.S. Cl.
CPC ...................................... *H02G 7/16* (2013.01)
USPC .......................................... 15/93.1; 174/40 R
(58) Field of Classification Search
CPC ....................................................... H02G 7/16
USPC .............................. 15/93.1; 174/40 R; 37/196
See application file for complete search history.

(56) References Cited

U.S. PATENT DOCUMENTS 6,660,934 B1 * 12/2003 Nourai et al. ............... 174/40 R

FOREIGN PATENT DOCUMENTS

| CN | 101202430 A | 6/2008 |
| CN | 201185330 Y | 1/2009 |
| CN | 101692571 A | 4/2010 |
| JP | 04281317 A * | 10/1992 |
| WO | WO0163715 A1 | 8/2001 |

OTHER PUBLICATIONS

Shi Weiping, the first office action, Nov. 2010, CN.

* cited by examiner

*Primary Examiner* — Shay Karls
(74) *Attorney, Agent, or Firm* — IPro, Inc.; Na Xu

(57) ABSTRACT

A quick cable deicing device and a power component thereof are provided. The deicing device comprises a cable clamping pedestal (11,13) which is sleeved on a cable and is capable of moving along the cable, a deicing head (21, 22) mounted at the head part of the cable clamping pedestal, and a power component which is connected with the tail part of the cable clamping pedestal and is capable of generating a thrust. The deicing device can advance and rotate at the same time under the drive of the power component. The power component comprises a gas tank (31) in a structure which conforms to a Laval nozzle principle and has an aperture expanded after sharply narrowed. The power component conforming to an aerodynamic principle is adopted to generate the momentary thrust to drive the whole device to advance and rotate at the same time; and the deicing velocity of the deicing device is high, while the rotational inertia improves the ice crushing capacity of the deicing head, thereby improving the deicing efficiency; the quick cable deicing device has a low cost, does not need manual operation after the cable is prepared in place, and has a higher safety.

20 Claims, 2 Drawing Sheets

QUICK CABLE DEICING DEVICE AND POWER COMPONENT THEREOF

TECHNICAL FIELD

The invention relates to a deicing device and a component, and more particularly to a quick cable deicing device and a component thereof.

BACKGROUND

Most of outdoor cables are easy to ice as a result of heavy snow or cold weather. If such severe weather lasts long, the ice layer on a cable will be gradually thickened and hardened, and the thickness of the ice layer will exceed four or five times (even more than) the diameter of the cable in severe cases, thereby greatly adding a load bearing to the cable. A thick layer of ice run will hang on the cable as a result of weather with rain, further adding a load bearing to the cable. If the weight exceeds the load limit of cables, cables and cable towers will be pulled down, affecting the regular production and life of people of using electricity, and causing accidents in severe cases.

There are three kinds of cable deicing technology in the prior art:

The first one is robot deicing technology, namely a robot is used to remove the ice layer on a cable. However, the weight of the robot itself is heavy, which tests the cable bearing capability; the robot is expensive, the price of an imported robot is millions of RMB, and the price of a robot independently researched and developed in China is hundreds of thousands of RMB. In addition, the key point is that the robot needs to work by taking power from the cable. The power obtained by the conventional technology of taking power from cables is at the level of 10 watts, and is not sufficient for the robot to conduct high-efficiency operation.

The second one is DC-based deicing technology, which is applied in China. The disadvantages of the deicing technology are summarized below: the cable needing to be deiced must be de-energized, and a certain equipment is used to energize the cable with DC, so that the cable emits heat to melt the ice layer, which causes certain influence and economic loss to the life and social production of people, and does not conform to the principle of energy saving because the heat emitted by the current is limited while the lost electric quantity is considerable.

The third one is artificial mechanical deicing technology, namely the ice layer is knocked by hand by people. The obvious disadvantages of the deicing technology are summarized below: people have low efficiency in the outdoor cold environment at low temperature, and have to work overhead where the cable is erected so that the deicing speed is slow, the efficiency is lower, and the personal accident may occur at any time.

SUMMARY

In view of the above-described technical problems of high cost, high power consumption, low efficiency and low safety factor existing in the prior art, the aim of the invention is to provide a quick cable deicing device and a power component thereof with advantages of low cost, safety, and high efficiency.

The purpose of the invention is achieved by the following technical schemes.

A quick cable deicing device is constructed, comprising a cable clamping pedestal which is sleeved on a cable and is capable of moving along the cable, a deicing head mounted at the head part of the cable clamping pedestal, and a power component which is arranged on the tail part of the cable clamping pedestal and is capable of generating a thrust; the thrust is capable of driving the whole quick cable deicing device to rotate.

In the quick cable deicing device of the invention, the quick cable deicing device comprises two groups of power components which are respectively positioned on both sides of the cable on the tail part of the cable clamping pedestal, and the directions of the force components perpendicular to the cable of the thrust generated by the two groups of power components are different.

In the quick cable deicing device of the invention, each group of the power component at least comprises one power component.

In the quick cable deicing device of the invention, the cable clamping pedestal comprises an upper pedestal, a lower pedestal, and a fastener for connecting the upper pedestal with the lower pedestal; after the upper pedestal is connected with the lower pedestal by the fastener, a circular through hole with a diameter larger than that of the cable is formed therebetween, and a cavity for containing the power component is provided therebetween.

In the quick cable deicing device of the invention, the deicing head comprises a proximal deicing head for removing ice layer from the periphery of the outer surface of the cable, and a distal deicing head for removing ice run drooping from the cable.

In the quick cable deicing device of the invention, the proximal deicing head is a cone gear which is centrally provided with a through hole for the cable to penetrate through and is fixed on the head part of the cable clamping pedestal; the distal deicing head comprises deicing rods different in length which are fixed on the cable clamping pedestal and are in parallel with the cable. The deicing rod far from the cable is long, and the deicing rod near the cable is short.

In the quick cable deicing device of the invention, the power component comprises a gas tank and a trigger device; the gas tank is a container with an aperture expanded after being sharply narrowed, and contains combustible fuel or high pressure gas; the trigger device ignites the combustible fuel or releases the high pressure gas to generate a momentary thrust via the violent expansion of the gas volume.

In the quick cable deicing device of the invention, the gas tank is in a structure which conforms to a Laval nozzle principle and has an aperture at the open end expanded after being sharply narrowed to the minimum.

In the quick cable deicing device of the invention, the minimum aperture diameter of the gas tank is not more than a half of the diameter of the tank, and the field angle outwards expanded at the minimum aperture is from 10° to 25°.

In the quick cable deicing device of the invention, the high pressure gas in the gas tank is filled in advance, or is compressed in the gas tank by an air pump at site before deicing.

In the quick cable deicing device of the invention, the power component comprises an energy storage component and a trigger component; wherein the energy storage component is a spring/coil, and the trigger component is a trigger/energizing switch. The trigger component is quickly opened to enable the spring or the energizing coil to generate a momentary thrust.

In the quick cable deicing device of the invention, the power component comprises a motor, a turbofan driven by the motor, and an air guide sleeve for guiding air sleeved outside the motor and the turbofan.

In the quick cable deicing device of the invention, the motor is provided with multiple stages and linearly adjustable speed, or is provided with multiple gears for different speed.

The quick cable deicing device of the invention further comprises a return component. The return component is a power return component which has the same structure as that of the power component and generates a thrust in the direction opposite to that generated by the power component, an electromechanical device which is capable of rotating the gas vent of the turbofan to 180°, a walking return component comprising a walking wheel and a motor, or a disengaging return component comprising a disengaging device of the cable clamping pedestal and a small parachute, and all the return components can conduct remote operation.

The quick cable deicing device of the invention further comprises an anti-collision component, and the anti-collision component comprises a front anti-collision component and a back anti-collision component which are respectively positioned on the head part and the tail part.

The invention further provides a power component of the quick cable deicing device, which comprises a gas tank for containing combustible fuel or high pressure gas; the structure of the gas tank conforms to a Laval nozzle principle, namely the aperture at the open end is expanded after being sharply narrowed to the minimum.

In the power component of the quick cable deicing device of the invention, the minimum aperture diameter of the gas tank is not more than a half of the diameter of the tank, and the field angle outwards expanded at the minimum aperture is from 10° to 25°.

In the power component of the quick cable deicing device of the invention, the power component further comprises a trigger device; the trigger device is used for igniting the combustible fuel or releasing the high pressure gas in the gas tank, and the gas tank and the trigger device are removably mounted on the quick cable deicing device.

Advantages of the quick cable deicing device of the invention are summarized below:

The quick deicing device of the invention has a simple structure and light weight, and is capable of deicing without adding the load bearing of cables; the power of the whole deicing device is greatly improved because the power component which conforms to an aerodynamic principle is adopted, thereby achieving the effect of quick deicing.

More importantly, the quick cable deicing device of the invention has low cost, does not need manual operation after the cable is prepared in place, has high safety factor, and can meet requirements of cable deicing among most of cable towers.

BRIEF DESCRIPTION OF FIGURES

The invention will further be described in detail in accordance with the figures and the examples, in the figures.

11. upper pedestal; 12. fastener; 13. lower pedestal; 21. proximal deicing head; 22. distal deicing head; 31. gas tank; 40. return component; 51. front anti-collision component; 52. back anti-collision component; 61. turbofan; 62. motor; 63. air guide sleeve.

DETAILED DESCRIPTION

Figure 1:
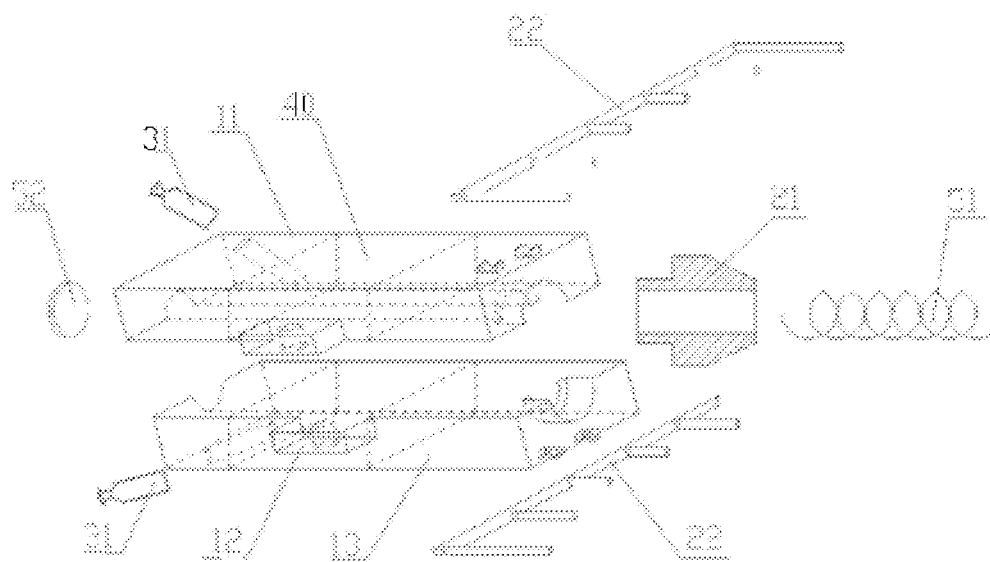
FIG. 1 is an explosive view of components of an example of a quick cable deicing device of the invention.

As shown in FIG. 1, a quick cable deicing device of the invention comprises a cable clamping pedestal which is sleeved on a cable and is capable of moving along the cable, a deicing head mounted at the head part of the cable clamping pedestal, and a power component which is arranged on the tail part of the cable clamping pedestal and is capable of generating a thrust; meanwhile, the quick cable deicing device further comprises a return component 40 which is mounted in the middle of the cable clamping pedestal and drives the whole quick cable deicing device to quickly return to the hand of an operator, or may comprise an anti-collision component which prevents the deicing head or the power component from colliding with respective cable bonds or cable towers in the front and back positions.

The cable clamping pedestal of the invention can be achieved in various means. In the example, the cable clamping pedestal may comprise an upper pedestal 11, a lower pedestal 13, and a fastener 12 for connecting the upper pedestal 11 with the lower pedestal 13. After the upper pedestal is connected with the lower pedestal by the fastener 12, a circular through hole with a diameter more than that of the cable is formed therebetween, and is used for the cable to penetrate and is capable of freely moving and rotating along the cable.

Preferably, positioning components which are in clearance fit with the cable are arranged at intervals in the circular through hole, to ensure that the circular through hole and the cable always coaxially share the center line, thereby reducing the unnecessary load brought by the eccentric shaking of the whole deicing device relative to the cable.

In addition, to make simple and beautiful appearance and reduce the resistance of the whole device in the process of advancing, the upper pedestal and the lower pedestal are designed into a structure formed with a cavity on the tail part after the upper pedestal is connected with the lower pedestal by the fastener 12, and the cavity thereof is used for containing the power component.

As shown in the figure, the deicing head of the invention comprises a proximal deicing head 21 for removing ice layer from the periphery of the outer surface of the cable, and a distal deicing head 22 for removing ice run drooping from the cable.

Wherein, the proximal deicing head 21 is a cone gear which is centrally provided with a through hole for the cable to penetrate through and is fixed on the head part of the cable clamping pedestal. When the whole deicing device is driven by the power component to advance and rotate at the same time, the cone gear also rotates. Thus, the ice layer on the periphery of the cable is crushed, a part of crushed ice scraps fall off, and a part of ice scraps enter the through hole of the proximal deicing head 21.

Preferably, the through hole of the proximal deicing head 21 are internally provided with sharp teeth which are extended toward the center and are used for secondarily crushing the part of the ice scraps entering the through hole, and heat is generated by friction to promote the ice scraps to be quickly crushed and melted, so as to achieve the purpose of deicing.

The distal deicing head 22 comprises deicing rods different in length which are integratedly connected with the periphery of the proximal deicing head 21 and are in parallel with the cable; the deicing rod far from the cable is long, and the deicing rod near the cable is short. As shown in the figure, to ensure balance of rotating torque, the periphery of the proximal deicing head 21 are symmetrically distributed with deicing rods, and two groups of same deicing rods are distributed on the periphery at an interval of 180°. The deicing rods can be divided into three groups, four groups, and even more groups; the number is determined in accordance with the quantity of ice run.

The anti-collision component is a component for preventing the deicing device from colliding with cable erection mechanisms such as cable bonds, or cable towers, etc. The anti-collision component comprises a front anti-collision component and a back anti-collision component which are respectively positioned at the front end of the deicing head and the back end of the power component, and can be achieved by cooperatively using various structures including springs, baffles, air washers, etc. such as the front anti-collision component 51 in a spring structure and the back anti-collision component in a washer structure as shown in FIG. 1.

The return component 40 of the invention is used for recovering the deicing device after accomplishing deicing operation, and can be achieved in various means:

(1) A walking return component, for example, a motor drives a gear, and the gear drives a rolling wheel to walk.

(2) A fall return component, for example, the fastener 12 of the aforementioned cable clamping pedestal is designed into an electromagnetic switch, and the opening or closing of the upper pedestal and the lower pedestal is set via remote control; after the deicing device accomplishes deicing operation, the fastener is unlocked, the upper pedestal and the lower pedestal are disconnected and then fall, and a certain parachute type structure is arranged therein, to ensure that the whole deicing device slowly falls.

(3) A power return component, for example, the structure which is the same as that of the power component is employed, only the direction of the thrust generated by the return component is changed to be opposite to that of the power component, and then the deicing device is returned to the hand of an operator in accordance with the same way after accomplishing deicing operation. For example, a motor or a turbofan driven by the motor may be used as the power component, and the power return component may be an electromechanical device which is capable of rotating the gas vent of the turbofan to 180°. Thus, the power component has an opposite thrust, and then provides return power for the deicing device.

The power component of the invention is achieved in various means:

(1) By chemical means, for example, a lot of gas is generated by combusting fuel in a container with a certain volume and makes the gas volume violently expand so that the gas dashes out of the container, to generate great explosive force and opposite thrust, to drive the whole deicing device to move, such as various solid or liquid fuel including powder, acetylene, alcohol, petrol, etc.

(2) By physical means, for example, the container of packaged canned high pressure gas suddenly cracks so that the high pressure gas is released, and the gas pressure is suddenly reduced. The high pressure gas runs out from the aperture and generates an opposite thrust large enough to drive the deicing device to advance. High pressure air or inert gas, etc. can be employed. Optionally, the high pressure gas is not always filled in advance, can be compressed and filled in the gas tank by an air pump and the like at deicing site. For example, the packaged dry ice ($CO_2$) is heated, the dry ice is gasified and the volume thereof is expanded, and a great opposite thrust is generated when the gasified $CO_2$ dashes out from the predetermined aperture. And for example, a thrust is generated by using electromagnetic force. A large coil with multiple turns is suddenly energized, a strong magnetic field is generated to give the deicing device a momentary thrust, and can be used as a power source of the invention; the coil is an energy storage component for storing energy, and the energizing switch for energizing the coil is a trigger component for triggering the energy storage component to release energy.

(3) By mechanical means, for example, a spring or an elastic element is used as the energy storage component, the spring or the elastic element for storing energy is compressed into a compressed energy storage state before the whole deicing device operates, and the energy of the energy storage component is released when starting the deicing device. For example, a trigger is used as a trigger component, and the trigger is pulled to lift the restriction to the spring or the elastic element which then generates momentary impulse to drive the deicing device. And for example, a pneudraulic device is used, and an electrical screw jack is employed.

Figure 2:
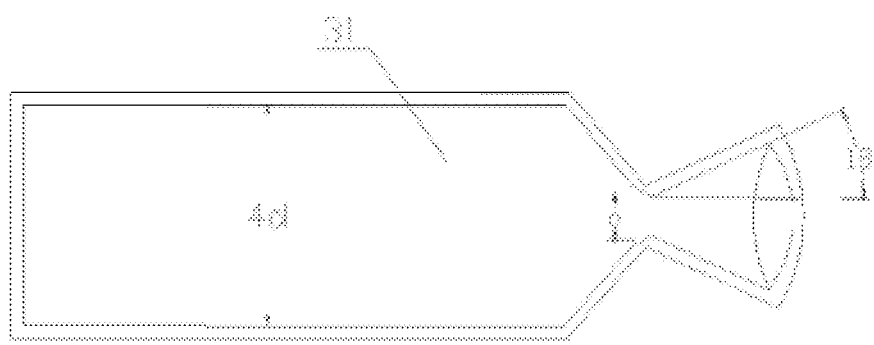
FIG. 2 is a structure diagram of a first example of a power component of a quick cable deicing device of the invention.

As shown in FIG. 2, the power component of a first example comprises a gas tank 31, and a momentary thrust is generated by the violent expansion of gas volume. The gas tank 31 is a container which is in a structure conforming to a Laval nozzle principle, has an aperture expanded after being sharply narrowed, and is used for containing combustible fuel or high pressure gas. The example may further comprise a trigger device for igniting the combustible fuel or releasing the high pressure gas to generate a lot of gas.

As shown in FIG. 2, the gas tank 31 in the example is a container with an aperture with a diameter less than that of the tank, and the minimum aperture diameter d is a quarter of the tank diameter $4d$. The aperture is expanded after being sharply narrowed, and is expanded into a flare cone angle of 18°. The invention is not limited to the gas tank 31 in the example, all the scope conforming to the Claims of the invention should be considered to belong to the protection scope of the invention.

Figure 3:
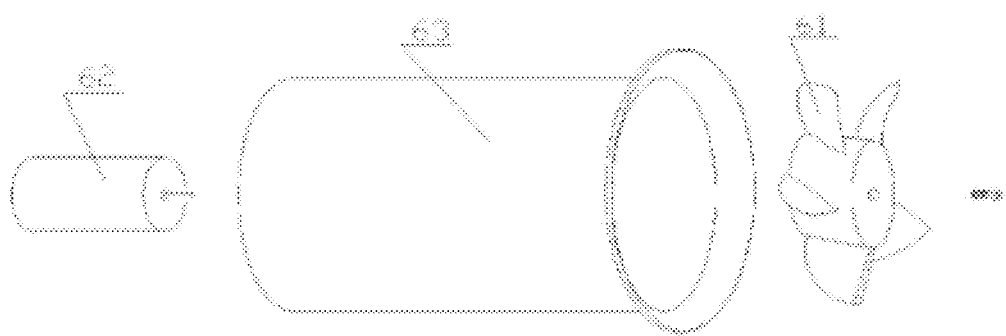
FIG. 3 is a structure diagram of a second example of a power component of a quick cable deicing device of the invention.

The power component of the aforementioned example is in a structure similar to the power structure of a jet rocket, and the power component of the invention can be in a structure simulating the power structure of the jet rocket. As shown in FIG. 3, the power component of a second example comprises a motor 62, a turbofan 61 driven by the motor 62, and an air guide sleeve 63.

The torque is output by the motor 62, and the motor 62 is required to have large output energy to improve the deicing capacity. The battery used by the motor 62 must be able to momentarily discharge and quickly release energy, so that the output shaft of the motor 62 can quickly achieve the maximum rotational speed. In addition, to adapt for the conditions of different thickness of ice layers, different deicing difficulty, etc., the motor 62 of the invention is provided with multiple stages and linearly adjustable speed, or is provided with multiple gears for different speed. Each gear can achieve the output of one rotational speed, and different gears can be selected to achieve the switching of different rotational speed.

Turbofan, also called turbine fan, is in a fan blade structure employed on the turbofan engine of an aircraft. In the field of aerospace, in the process of rotation, the turbofan plays a role of compressing air and of a propeller, thereby generating high flight speed. The turbofan 61 of the invention employs a small turbofan with the same curved surface structure as that of a turbine fan employed on an aircraft, and the preferable diameter of the turbofan is within 200 mm by comprehensively considering the factors of self weight, ice covering resistance, wire bearing capacity and the like. The turbofan 61 is connected with the output shaft of the motor 62, or is connected with different shafts of the motor 62 by certain connecting and driving mechanisms. The air guide sleeve 63 is sleeved outside the motor 62 and the turbofan 61 to play a role of protecting the turbofan 61 and guiding air.

By employing the aforementioned combined power component, to achieve the deicing effect, the turbofan 61 generates the thrust of more than 300 N when being driven by the corresponding motor, the advancing speed reaches 180 Km/h, and the deicing efficiency of the combined power component is high.

In addition, an engine can be used as the power component, the petrol inside the engine is combusted and gas is blown out to form a thrust.

To enable the power component of the invention to generate a thrust capable of driving the whole deicing device to rotate, as shown in FIG. 1, in the first example, two gas tanks 31 are designed, are respectively positioned on both sides of the tail part of the cable clamping pedestal, and are simultaneously deflected at a minute angle relative to the axial direction. Thus, gas was spouted out of the gas tanks 31 at a certain slant angle relative to the axial direction of the cable, so that the generated opposite thrust has a force component which is in parallel with the axial direction of the cable and is capable of driving the whole deicing device to advance along the cable, and further has a force component which is perpendicular to the axial direction of the cable and rotates around the cable. The force components of the opposite thrust of the gas from the two gas tanks 31 form a torque around the axis, thereby driving the whole deicing device to rotate around the cable. It is known from the above-mentioned, the rotation of the deicing device drives the proximal deicing head and the distal deicing head to rotate so that the deicing operation is effectively conducted. Of course, the number of the gas tanks 31 forming the power component can be multiple. The gas tanks 31 are divided into two groups and are respectively positioned on both sides of the cable; the gas tanks 31 of each group are mutually fixed together in parallel, so that the directions of the thrust generated are consistent, thereby ensuring the force components perpendicular to the cable of the two groups of the gas tanks can form a torque all the time when increasing the thrust.

In addition, the thrust capable of driving the deicing device to rotate can be achieved by designing a structure for making the gas produce flow direction in a gas tank 31. For example, the inner wall of the gas tank is designed into a spiral shape which conforms to a certain aerodynamic principle, to drive the gas to form a spiral flow direction when the gas dashes out of the gas tank 31, thereby, having certain radial force components to drive the deicing device to rotate.

Similarly, in the second example, the two groups of turbofans and motors are respectively positioned on both sides of the tail part of the cable clamping pedestal; the axes of the two motors are respectively and axially deflected at a certain angle relative to the cable, and the deflecting directions respectively face above and below the horizontal cable. When the turbofans rotate and generate a thrust, the two thrusts have force components of opposite directions, the two force components rotate around the cable, to form the torque to drive the whole deicing device to rotate around the cable.

Both sides of the cable clamping pedestal are respectively provided with multiple power components comprising turbofans and motors. The power components on each side form a group and have the same thrust direction; thus, the force components forming the torque are increased when the thrust effect is improved, and the deicing capacity is increased.

The characteristics of the power component of the invention are limited to the preferred examples, various examples can be designed in accordance with the various means of the aforementioned power component, and the example will not give more details.

The invention is described in detail in accordance with the above preferred examples. However, this invention is not limited to the preferred examples. On the premise of keeping the spirit and the principle of the invention, all modifications, equivalent replacements and improvements, etc. should be considered to belong to the protection scope of the invention.

We claim:

1. A quick cable deicing device, comprising: a cable clamping pedestal configured to be sleeved on a cable and capable of moving along the cable, a deicing head mounted on a head part of the cable clamping pedestal, and a power component connected with a tail part of the cable clamping pedestal and capable of generating a thrust; the quick cable deicing device is configured to advance along the cable and rotate around the cable at the same time under the drive of the power component.

2. The quick cable deicing device of claim 1, wherein said power components comprise two groups positioned such that the two groups generate a torque around the cable, thereby causing the quick cable deicing device to rotate around the cable.

3. The quick cable deicing device of claim 1, wherein said cable clamping pedestal comprises an upper pedestal, a lower pedestal, and a fastener configured to connect said upper pedestal with said lower pedestal; wherein after said upper pedestal is connected with said lower pedestal by said fastener, a circular through hole with a diameter larger than that of the cable is formed therebetween, and a cavity for containing the power component is provided therebetween.

4. The quick cable deicing device of claim 1, wherein said deicing head comprises a proximal deicing head configured to remove ice layer from a periphery of an outer surface of the cable, and a distal deicing head configured to remove icicles from the cable.

5. The quick cable deicing device of claim 4, wherein said proximal deicing head comprises a cone gear with a central through hole and is fixed on the head part of the cable clamping pedestal.

6. The quick cable deicing device of claim 4, wherein said distal deicing head comprises deicing rods substantially parallel with the cable; wherein deicing rods farther from the cable is longer than deicing rods closers to the cable.

7. The quick cable deicing device of claim 1, wherein said power component comprises a gas tank with a nozzle, and a trigger device; wherein said gas tank is configured to contain combustible fuel or high pressure gas; wherein said trigger device is configured to ignite said combustible fuel or release said high pressure gas, thereby generating the thrust.

8. The quick cable deicing device of claim 7, wherein the nozzle is a de Laval nozzle.

9. The quick cable deicing device of claim 8, wherein a diameter of a throat of the nozzle is not more than a half of a diameter of the tank.

10. The quick cable deicing device of claim 8, wherein a divergent cone half-angle of the nozzle at a throat of the nozzle is from 10° to 25°.

11. The quick cable deicing device of claim 7, wherein the high pressure gas in said gas tank is filled in advance, or is compressed in said gas tank by an air pump at site before deicing.

12. The quick cable deicing device of claim 1, wherein said power component comprises an energy storage component; wherein said energy storage component comprises a spring or coil.

13. The quick cable deicing device of claim 1, wherein said power component comprises a motor, a turbofan driven by said motor, and an air guide sleeve.

14. The quick cable deicing device of claim 13, wherein speed of said motor adjustable.

15. The quick cable deicing device of claim 1, wherein said quick cable deicing device is configured to disengage the cable; or wherein said quick cable deicing device is configured to retreat along the cable.

16. The quick cable deicing device of claim 1, further comprising an anti-collision component comprising a front anti-collision component positioned on the head part and a back anti-collision component positioned on the tail part.

17. The quick cable deicing device of claim 1, wherein said power component comprises a gas tank with a nozzle, wherein said gas tank is configured to contain combustible fuel or high pressure gas.

18. The quick cable deicing device of claim 17, wherein the nozzle is a de Laval nozzle; or wherein a divergent cone half-angle of the nozzle at a throat of the nozzle is from 10° to 25°.

19. The quick cable deicing device of claim 17, wherein said power component further comprises a trigger device; wherein said trigger device is configured to ignite said combustible fuel or release said high pressure gas, and wherein said gas tank and said trigger are removably mounted on said quick cable deicing device.

20. The quick cable deicing device of claim 1, further comprising a return component; wherein said return component is configured to generate a thrust in the direction opposite to that generated by said power component; or wherein said return component is configured to reverse the thrust generated by said power component; or wherein said return component comprises a walking wheel and a motor, or wherein said return component comprises a parachute.

\* \* \* \* \*